(12) United States Patent
Fukuda

(10) Patent No.: US 9,539,974 B2
(45) Date of Patent: Jan. 10, 2017

(54) AIRBAG DEVICE AND COVERING METHOD FOR AIRBAG BODY

(71) Applicant: HONDA MOTOR CO., LTD., Tokyo (JP)

(72) Inventor: Takeru Fukuda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/766,243

(22) PCT Filed: Dec. 12, 2013

(86) PCT No.: PCT/JP2013/083315
§ 371 (c)(1),
(2) Date: Aug. 6, 2015

(87) PCT Pub. No.: WO2014/129054
PCT Pub. Date: Aug. 28, 2014

(65) Prior Publication Data
US 2015/0367801 A1 Dec. 24, 2015

(30) Foreign Application Priority Data
Feb. 21, 2013 (JP) ................................. 2013-031655

(51) Int. Cl.
*B60R 21/201* (2011.01)
*B60R 21/213* (2011.01)
(Continued)

(52) U.S. Cl.
CPC ........... *B60R 21/201* (2013.01); *B60R 21/213* (2013.01); *B60R 21/232* (2013.01); *B65B 53/02* (2013.01)

(58) Field of Classification Search
CPC ..... B60R 21/201; B60R 21/213; B60R 21/214
See application file for complete search history.

(56) References Cited

U.S. PATENT DOCUMENTS

| 6,733,035 B2 * | 5/2004 | Thomas ............... B60R 21/232 280/730.2 |
| 2003/0017285 A1 * | 1/2003 | Cantrell ................. B29C 55/28 428/35.1 |

(Continued)

FOREIGN PATENT DOCUMENTS

| JP | 2005-525263 A | 8/2005 |
| JP | 2006-69248 A | 3/2006 |

(Continued)

OTHER PUBLICATIONS

International Search Report dated Mar. 18, 2014, issued in counterpart International Application No. PCT/JP2013/083315 (4 pages).

*Primary Examiner* — James English
(74) *Attorney, Agent, or Firm* — Westerman, Hattori, Daniels & Adrian, LLP

(57) ABSTRACT

Two twist-preventing members are respectively placed against the top and the bottom of an airbag body. The length direction of the twist-preventing members aligns with the length direction of the airbag body. The airbag body, the twist-preventing members, and a tab have been covered with a heat-shrinkable film in said state, and the heat-shrinkable film has been shrunken by heat.

7 Claims, 8 Drawing Sheets

(51) Int. Cl.
*B60R 21/232* (2011.01)
*B65B 53/02* (2006.01)

(56) References Cited

U.S. PATENT DOCUMENTS

| | | |
|---|---|---|
| 2003/0188979 A1 | 10/2003 | Saderholm et al. |
| 2006/0043708 A1 | 3/2006 | Inazu et al. |
| 2007/0126214 A1* | 6/2007 | Quach ................ B60R 21/213 |
| | | 280/730.2 |
| 2008/0122203 A1* | 5/2008 | Steinbach ............ B60N 3/026 |
| | | 280/728.2 |
| 2008/0258445 A1* | 10/2008 | Quach ................ B60R 21/213 |
| | | 280/743.1 |
| 2012/0211971 A1 | 8/2012 | Okamura et al. |
| 2013/0119648 A1 | 5/2013 | Nakamura et al. |
| 2013/0214516 A1* | 8/2013 | Min .................... B60R 21/232 |
| | | 280/728.2 |

FOREIGN PATENT DOCUMENTS

| | | |
|---|---|---|
| JP | 2011-105079 A | 6/2011 |
| JP | 2012-171412 A | 9/2012 |
| WO | 2012/011343 A1 | 1/2012 |

* cited by examiner

AIRBAG DEVICE AND COVERING METHOD FOR AIRBAG BODY

TECHNICAL FIELD

The present invention relates to an airbag device and a covering method for an airbag body.

BACKGROUND ART

Patent Document 1 discloses a technology using a heat-shrinkable film in order to temporarily hold an airbag. Patent Document 2 discloses an expansion direction restricting portion formed on a lower surface of an airbag of an expansion auxiliary member, and a protector portion preventing the airbag from expanding to an opposite side of a vehicle compartment.

CITATION LIST

Patent Literature

{Patent Document 1}
Japanese Patent Application Publication No. 2012-171412
{Patent Document 2}
Japanese Patent Application Publication No. 2011-105079

SUMMARY OF INVENTION

Technical Problem

As an airbag which is mounted on a vehicle, a side curtain airbag is known. The side curtain airbag can absorb an impact against a passenger's head, prevent the passenger from being released outside the vehicle, and prevent the passenger from being injured by glass scattering, in case of a side collision of the vehicle. Further, the side curtain airbag can absorb an impact against the passenger's head by a glass and a pillar of the vehicle, in case of a front (oblique) collision of the vehicle. Such a side curtain airbag is attached to a vehicle body by being folded in an elongated shape. When attaching the side curtain airbag, the side curtain airbag is fixed to the vehicle body by tabs which are attached to plural locations in a longitudinal direction of the folded side curtain airbag.

However, since the folded side curtain airbag is an elongated shape, there is a case where a portion not yet attached of the side curtain airbag is twisted when attaching a tab to the vehicle body at a location thereof during the attaching operation. Therefore, there is a possibility that the attaching operation of the side curtain airbag to the vehicle body is performed while the twisted portion is in a twisted state. In this situation, an object of the present invention is to provide an air bag device capable of attaching an airbag body to the vehicle body without being twisted, and a covering method for the airbag body.

Solution to Problem

In order to solve the above problems, an embodiment of the present invention is an airbag device including: an inflator; an airbag body which is folded, so as to be inflated with a gas generated from the inflator to flow therein upon activation of the inflator; a twist-preventing member for preventing twisting of the airbag body in a folded state; and a heat-shrinkable film for covering the twist-preventing member and the airbag body in the folded state.

According to the present invention, when heat-shrinking the heat-shrinkable film, the airbag body in the folded state is fixed and held by the twist-preventing member and the heat-shrinkable film which is shrunk. Therefore, the airbag body is supported by the twist-preventing member and the heat-shrinkable film, and thus it is difficult to be bent or warped. When performing the attaching operation of the airbag body to the vehicle body, a portion of the airbag body on a side not yet attached to the vehicle body is difficult to be bent or warped, and thus the airbag body is not twisted during the attaching operation. Therefore, it is possible to prevent the airbag body from being attached to the vehicle body while being in the twisted state.

Further, since the airbag body is attached to the vehicle body in a state where the airbag body is covered with the hear-shrinkable film, it is possible to prevent the airbag body from being damaged due to irregularities or the like existing on a surface of the vehicle body, during the attaching operation of the airbag or after the attaching operation. Further, since the airbag body is fixed and held by the heat-shrinkable film which is shrunk by heat, it is possible to attach the airbag body in a sufficiently compressed state to the vehicle body. Therefore, it is possible to reduce the size of the airbag device.

In the invention described above, the twist-preventing member may be a rod member provided so as to be along the airbag body, a length direction of the twist-preventing member being aligned with a longitudinal direction of the airbag body. In this case, by the twist-preventing member that is the rod member, it is possible to prevent the airbag body from being attached to the vehicle body while being in the twisted state.

In the invention described above, the airbag device may further include an attachment portion for attaching the airbag body to the vehicle body, and the heat-shrinkable film may further cover the attachment portion. In this case, the attachment portion is also covered with the heat-shrinkable film which is shrunk by heat, and is firmly fixed and held together with the airbag body. Therefore, the attachment portion is held, for example, in an upright state from the airbag body, and thus does not fall down. Therefore, it is easy to perform the attaching operation of the attachment portion to the vehicle body.

In this invention, the attachment portion may be continuously formed over the entire longitudinal direction of the airbag body in the folded state. In this case, by firmly supporting the airbag body by the heat-shrinkable film and the attachment portion which is continuously formed over the entire longitudinal direction of the airbag body, it is possible to further prevent the airbag body from being twisted.

In the invention described above, the heat-shrinkable film may further include a breaking portion to be broken when the airbag body is inflated. In this case, the heat-shrinkable film is broken at the breaking portion by inflation of the airbag body, and the airbag body jumps out from an opening formed by the breaking of the heat-shrinkable film, and thus the heat-shrinkable film does not prevent expansion of the airbag body.

In this invention, the breaking portion may be formed in the heat-shrinkable film so as not to overlap the twist-preventing member. In this case, for example, during the attaching operation of the airbag body to the vehicle body, the breaking portion is not inadvertently broken by pressure of the twist-preventing member.

Another embodiment of the present invention is a covering method for an airbag body, including following steps: a step of placing a twist-preventing member for preventing twisting of the airbag body on the airbag body which is folded; a step of covering the airbag body and the twist-preventing member with a heat-shrinkable film after the above step; and a step of heat-shrink by heating the heat-shrinkable film after the above steps.

According to the present invention, the airbag body in the folded state is fixed and held by the twist-preventing member and the heat-shrinkable film which is shrunk. Therefore, the airbag body is supported by the twist-preventing member and the heat-shrinkable film, and thus is difficult to be bent or warped. When performing the attaching operation of the airbag body to the vehicle body, a portion of the airbag body on the side not yet attached to the vehicle body is difficult to be bent or warped, and thus the airbag body is not twisted during the attaching operation. Therefore, it is possible to prevent the airbag body from being attached to the vehicle body while being in the twisted state.

Further, since the airbag body is attached to the vehicle body in the state where the airbag body is covered with the hear-shrinkable film, it is possible to prevent the airbag body from being damaged due to irregularities or the like existing on the surface of the vehicle body, during the attaching operation of the airbag or after the attaching operation. Further, since the airbag body is fixed and held by the heat-shrinkable film which is shrunk by heat, it is possible to attach the airbag body in the sufficiently compressed state to the vehicle body. Therefore, it is possible to reduce the size of the airbag device.

Advantageous Effects of Invention

According to the present invention, it is possible to provide an airbag device capable of attaching the airbag body to the vehicle body without being twisted, and a covering method for the airbag body.

DESCRIPTION OF EMBODIMENTS

Figure 1:
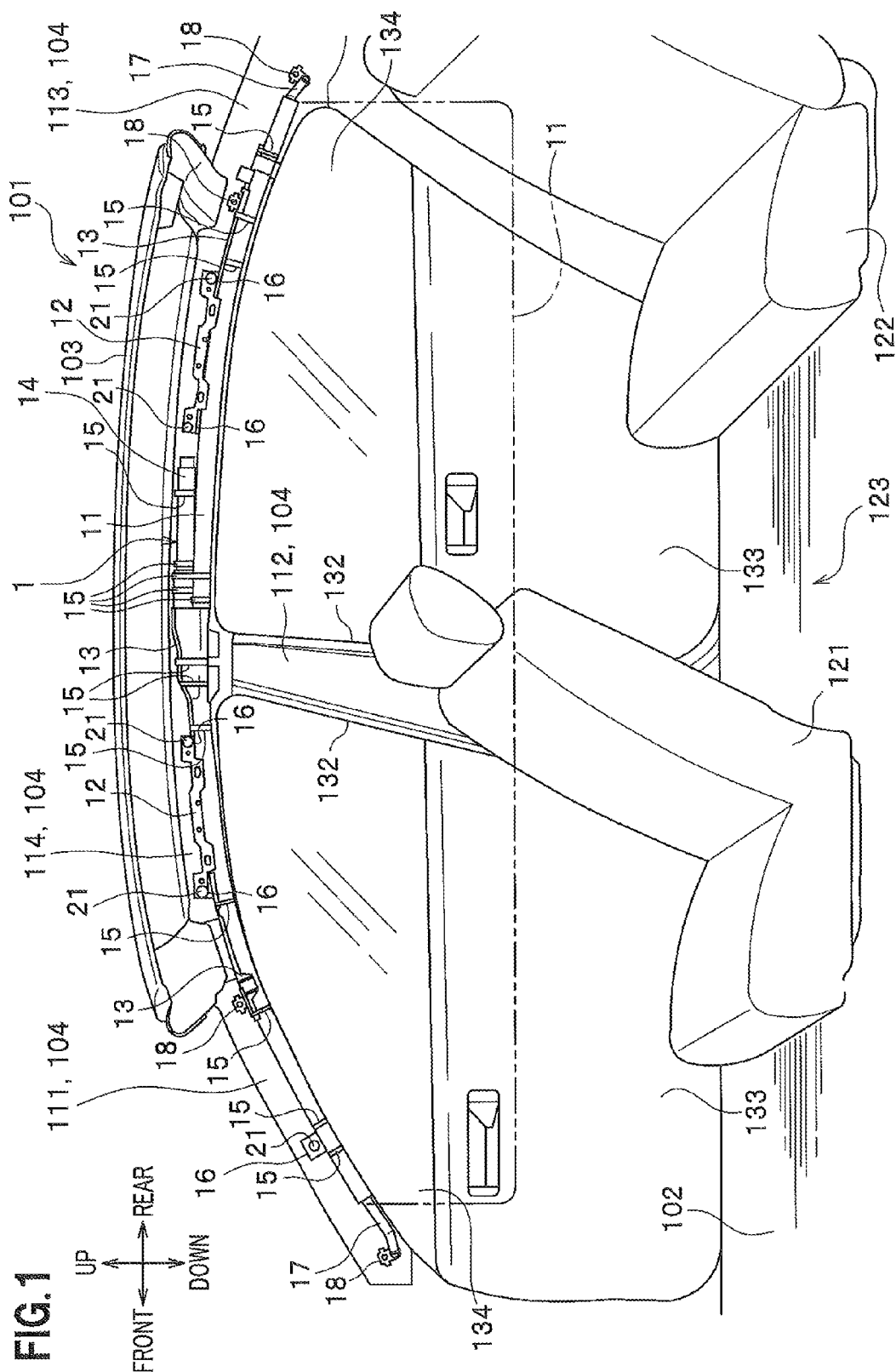
FIG. 1 is an explanatory view showing a structure for attaching an airbag device according to an embodiment of the present invention to a vehicle.
Figure 2:
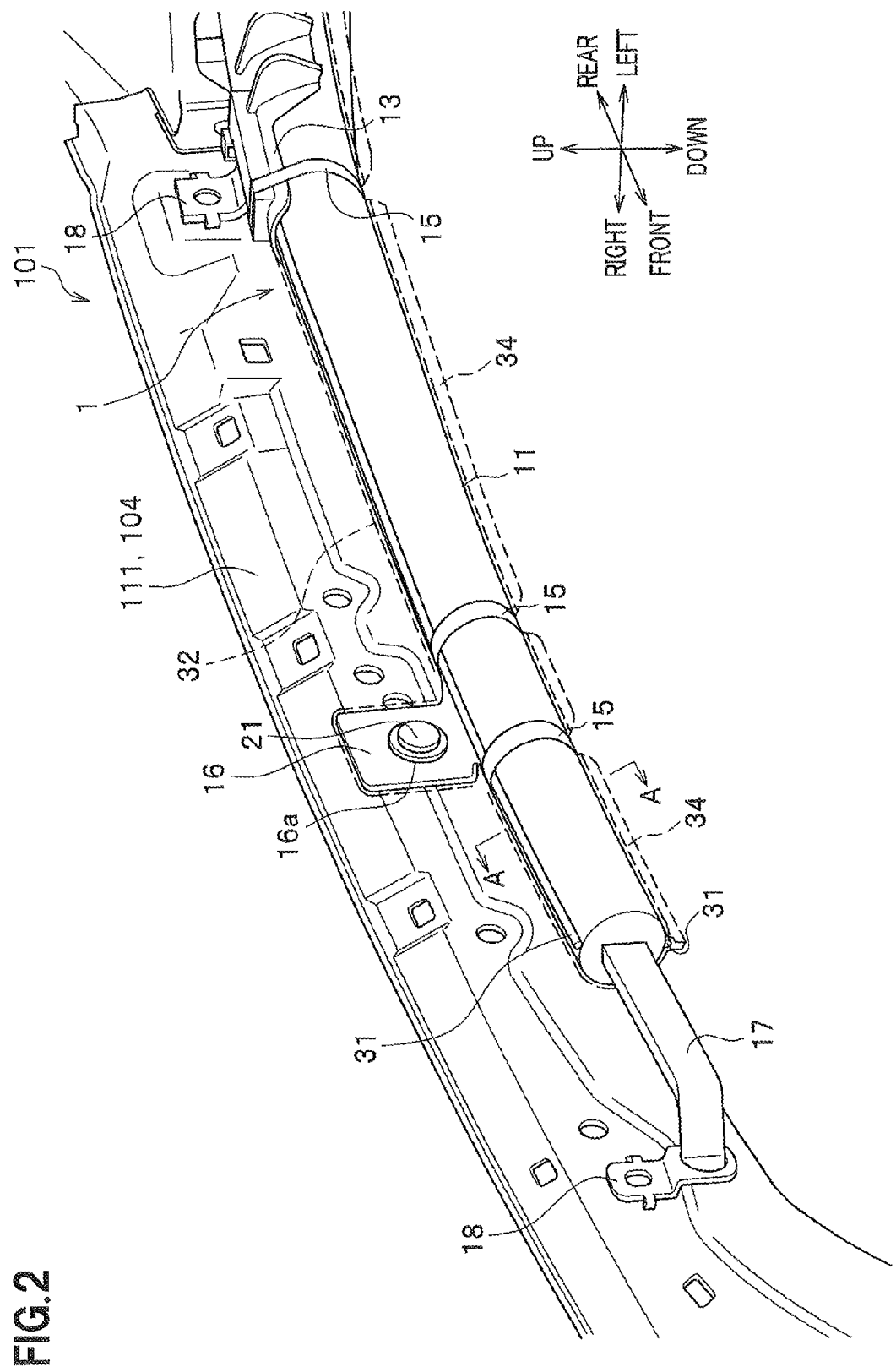
FIG. 2 is an enlarged perspective view of a front pillar portion attached with the airbag device according to the embodiment of the present invention.

Hereinafter, an embodiment of the present invention will be described with reference to the drawings. FIG. 1 is an explanatory view showing a structure for attaching an airbag device 1 according to the embodiment of the present invention to the vehicle 101. Note that, directions of the vehicle 101 are shown in each drawing of FIG. 1 and FIG. 2 described below. Further, only one airbag device 1 attached to the right side of the vehicle 101 is shown in FIGS. 1 and 2, however, the other airbag device 1 of the same configuration is also attached to the left side of the vehicle 101 in the left-right symmetry.

As shown in FIG. 1, the vehicle 101 includes a floor 102 constituting a lower portion of a vehicle body, a roof 103 constituting an upper portion of the vehicle body, a front pillar 111, a center pillar 112, a rear pillar 113, and a roof side rail 114, which constitute a side portion of the vehicle body, and a curtain side airbag device (airbag device) 1 which is inflated and expanded so as to cover a side portion in a vehicle compartment 123 of the vehicle 101. Note that, in the following description, the front pillar 111 and the like constituting the side portion of the vehicle body is also referred to as a vehicle body 104.

On the floor 102 of the vehicle 101, a front seat 121 and a rear seat 122 which are seated by occupants are provided back and forth. On the side of the front seat 121 and the rear seat 122, door openings 132 are provided back and forth across the center pillar 112. Doors 133 are attached openably and closably to the door openings 132, and side windows 134 are provided vertically movably in the doors 133. Note that, although both are not shown, the roof 103 is provided with a roof lining on the vehicle compartment 123 side, and the front pillar 111 and the rear pillar 113 are provided with pillar garnishes on the vehicle compartment 123 side. These roof lining and pillar garnishes are interior materials for covering the airbag device 1 from the vehicle compartment 123 side, and prevent the airbag device 1 in a non-expanded state from being exposed to the vehicle compartment 123 side.

Further, although not shown, the vehicle 101 is provided with an acceleration sensor capable of detecting an impact, and an ECU (Electronic Control Unit). The ECU is a control unit including a microcomputer, and to which the acceleration sensor and an inflator 14 described below are connected via signal lines (not shown). The acceleration sensors are disposed, for example, on a side portion of the floor 102, and respectively in the vicinity of an installation site of the front seat 121, and in the vicinity of an installation site of the rear seat 122.

The airbag device 1 includes an airbag body 11 disposed along an upper edge portion (upper side portion of the vehicle compartment 123) of the side window 134, brackets 12 for attaching the airbag body 11 to the vehicle body 104, protectors 13 disposed between the airbag body 11 and the vehicle body 104, and the inflator 14 for supplying a gas (pressure fluid) into the airbag body 11.

The airbag body 11 is a fabric member which is inflated and expanded downward in a curtain shape as shown by a two-dot chain line in FIG. 1, when the gas is supplied thereto from the inflator 14. The airbag body 11 is formed, for example, by stitching together plural base fabrics in a bag shape. The airbag body 11 is disposed from the front pillar 111 to the rear pillar 113 via the roof side rail 114, to be formed in an elongated shape in the front-rear direction.

In the present embodiment, the airbag body 11 is schematically drawn in each drawing, however, by folding up the airbag body 11, for example, in a roll shape, or in a bellows shape, and by winding a plurality of tapes 15 around an outer surface of the airbag body 11, the airbag 11 is held in a folded state. Further, some of the tapes 15 are wound over the airbag body 11 and the protectors 13, and further have a function of connecting the both members to each other. The tapes 15 are configured to be broken when the airbag body 11 is expanded. Further, the airbag body 11 is integrally provided with tabs 16 and tethers 17, which are attachment portions for attaching the airbag body 11 to the vehicle body 104.

The tab 16 is formed on the airbag body 11 so as to extend upward from an upper end portion of the airbag body 11, and is an attachment piece of a plate-like and rectangular shape, which is fixed to the vehicle body 104. The tabs 16 are plurally disposed on the airbag body 11 spaced apart from each other in the longitudinal direction of the folded airbag body 11 (in an example of the airbag body 11 shown in FIG. 1, there are provided five tabs, however, four of them are hidden by the brackets 12).

Figure 3:
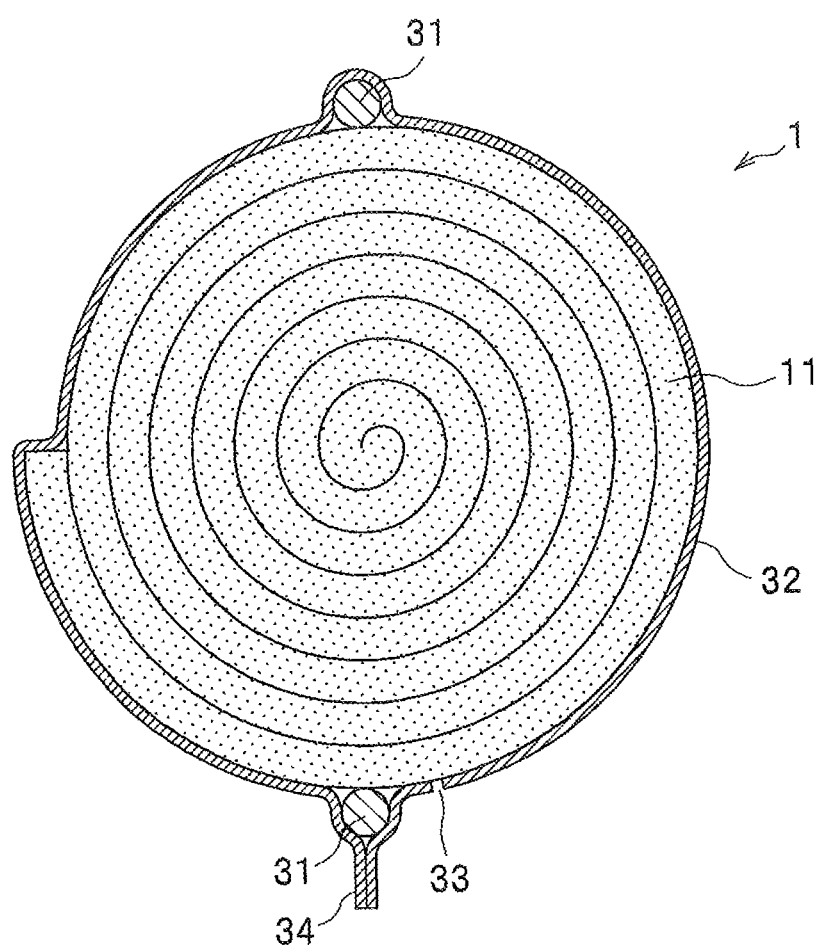
FIG. 3 is a cross-sectional view taken along a line A-A in FIG. 2.

FIG. 2 is an enlarged perspective view of the front pillar 111 portion attached with the airbag device 1 according to the present embodiment. FIG. 3 is a cross-sectional view taken along a line A-A of the airbag body 11 in FIG. 2. As shown in FIG. 2, a circular attachment hole 16a is formed in the tab 16. One tab 16 is attached to the front pillar 111 by a clip 21 inserted through the attachment hole 16a. Although detailed illustration is omitted, the other tabs 16 are held sandwiched between the brackets 12 and the roof side rail 114. Further, the other tabs 16 are attached to appropriate positions of the roof side rail 114 by the brackets 12 being fixed to the roof side rail 114 by the clips 21.

As shown in FIGS. 1 and 2, the tethers 17 are provided, one each at the front and rear end portions of the airbag body 11, and are deformable strip-shaped portions connecting the airbag body 11 to the front pillar 111 and the rear pillar 113. The tether 17 located at the front is provided to project forward from the front end portion of the airbag body 11, so as to be attached to the front pillar 111 via an attachment bracket 18. The tether 17 located at the rear is provided to project backward from the rear end portion of the airbag body 11, so as to be attached to the rear pillar 113 via an attachment bracket 18. As shown in FIG. 1, the brackets 12 are metal members which are plurally disposed spaced apart from each other in the longitudinal direction of the airbag body 11. The bracket 12 is formed, for example, by bending by press working of a metal plate. The front and rear end portions (both end portions in the longitudinal direction) of the bracket 12 are fixed to the roof side rail 114 by the clips 21.

As shown in FIGS. 1 and 2, the protectors 13 are resin members which are plurally disposed spaced apart from each other in the longitudinal direction of the airbag body 11. The protectors 13 have functions of preventing the airbag body 11 from being damaged in contact with irregularities or the like of the vehicle body 104, as well as restricting the expansion direction of the airbag body 11. The protectors 13 are attached to appropriate positions of the vehicle body 104 via the attachment brackets 18. As shown in FIG. 2, the protector 13 is formed in a curved shape along the upper outer surface of the folded airbag body 11 from the outer surface on the vehicle outside of the folded airbag body 11.

As shown in FIG. 1, the inflator 14 is attached to the roof side rail 114. Note that, the number and the installation position of the brackets 12, the protectors 13 and the inflator 14 may be appropriately changed.

As shown in FIGS. 2 and 3, in this example, twist-preventing members 31 are respectively provided, for example, at the top and bottom of the airbag body 11 which is folded, for example, in a roll shape. The twist-preventing members 31 are formed, for example, of resin or light metal, and are rod members, which are disposed so as to be along the surface of the airbag body 11 folded in a roll shape, the length direction of the twist-preventing members 31 being aligned with the longitudinal direction of the airbag body 11. The twist-preventing members 31 are members for preventing the airbag body 11 from being twisted, by being disposed so as to be along the surface of the airbag body 11 in the folded state.

Further, the airbag body 11, the twist-preventing members 31, and the tabs 16 are covered with a heat-shrinkable film 32. The heat-shrinkable film 32 is a film having a property of shrinking by heating. As described above, the airbag body 11 is covered with the heat-shrinkable film 32 together with the tabs 16, in a state where the twist-preventing members 31 are placed thereon, and the heat-shrinkable film 32 is heat-shrunk by heating. As a result, the airbag body 11, the twist-preventing members 31, and the tabs 16 are firmly fixed and held by the heat-shrinkable film 32 which is heat-shrunk.

Thus, the airbag body 11, the twist-preventing members 31, and the tabs 16, which are in a state of being fixed and held by the heat-shrinkable film 32 that is shrunk, are attached to the vehicle body 104 by the clips 21 at the tabs 16. Further, in a state where the airbag body 11 together with the tabs 16 and the twist-preventing members 31 are fixed and held by the heat-shrinkable film 32, the plurality of tapes 15 are wound around the outer surface thereof.

Further, as shown in FIG. 3 (also refer to FIG. 6), the heat-shrinkable film 32 is formed with a breaking portion 33, for example, which is a perforation-like slit, for example, at a lower position of the airbag body 11, a length direction of the breaking portion 33 being aligned with the longitudinal direction of the airbag body 11. The breaking portion 33 is a portion of the heat-shrinkable film 32, which is broken by a pressure of the inflated airbag body 11, when the gas is supplied to the airbag body 11 from the inflator 14 and the airbag body 11 is inflated and expanded. In other words, the breaking portion 33 is the most vulnerable portion to the pressure of the inflated airbag body 11 in the heat-shrinkable film 32, and is broken first when subjected to the pressure of the airbag body 11. In an example shown in FIG. 3 or the like, the expansion direction of the airbag body 11 is downward, and thus the breaking portion 33 is formed on the lower side of the airbag body 11 in the folded state. Further, as shown in FIG. 3, the breaking portion 33 is formed so as not to overlap an arrangement position of the twist-preventing member 31. Further, in the example shown in FIG. 3 or the like, the breaking portion 33 is only one, the length direction of the breaking portion 33 being aligned with the longitudinal direction of the airbag body 11, however, it may be plurally formed.

Figure 4:
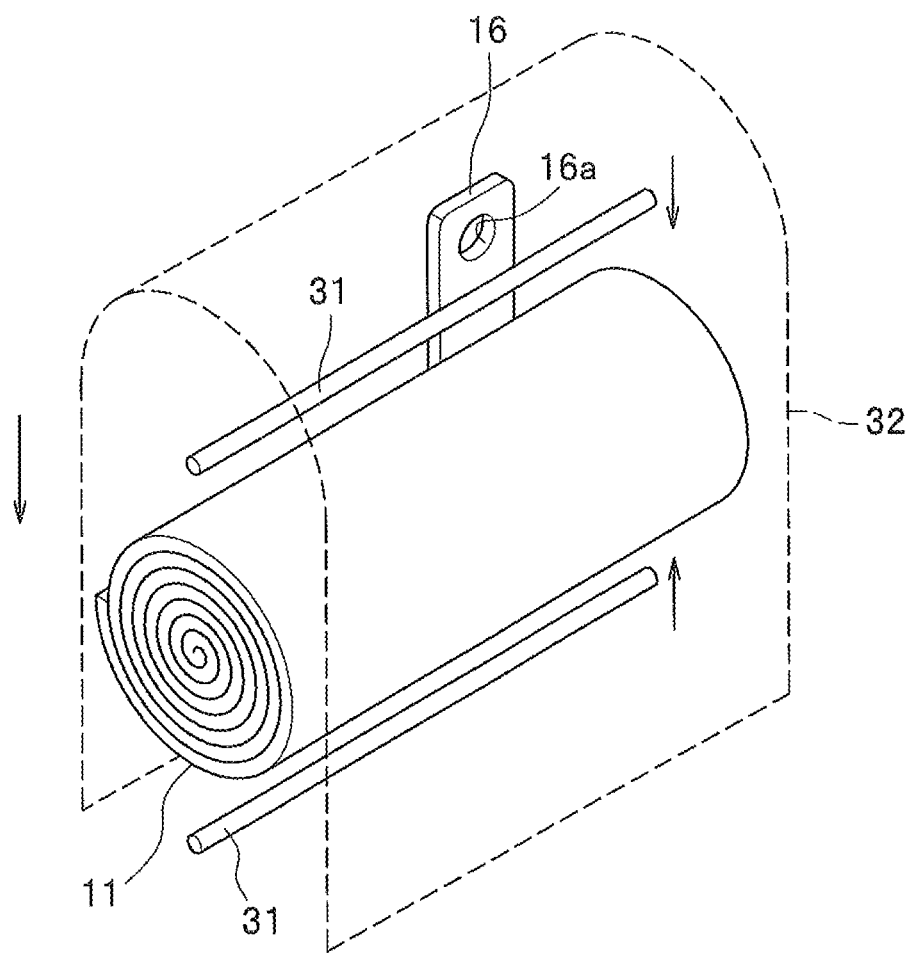
FIG. 4 is an explanatory view for explaining a step of providing a twist-preventing member and a heat-shrinkable film to an airbag body of the airbag device according to the embodiment of the present invention.
Figure 5:
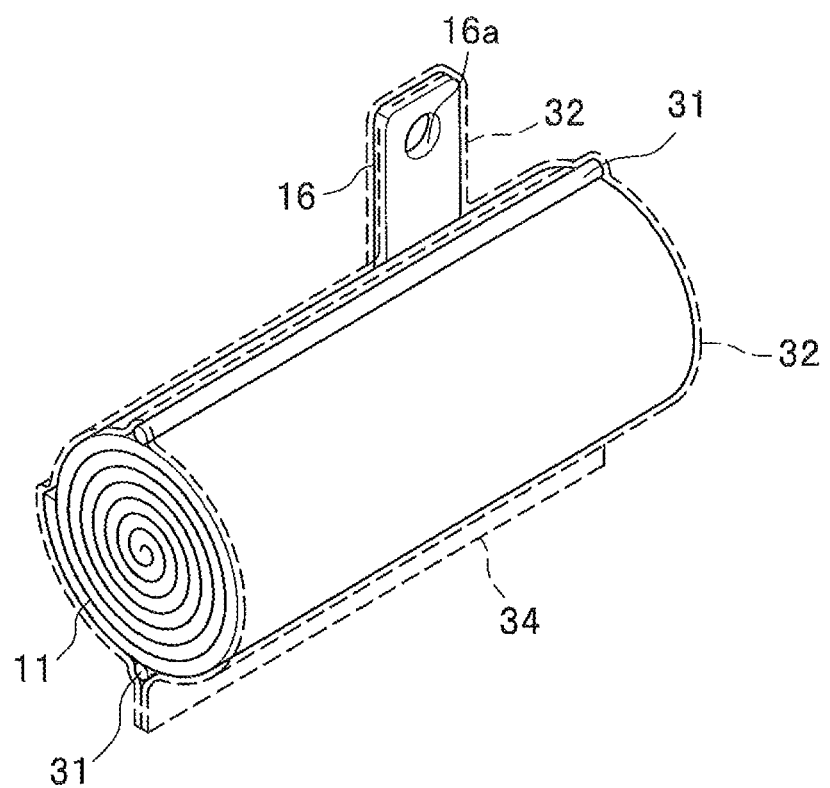
FIG. 5 is an explanatory view for explaining a step of providing the twist-preventing member and the heat-shrinkable film to the airbag body of the airbag device according to the embodiment of the present invention.
Figure 6:
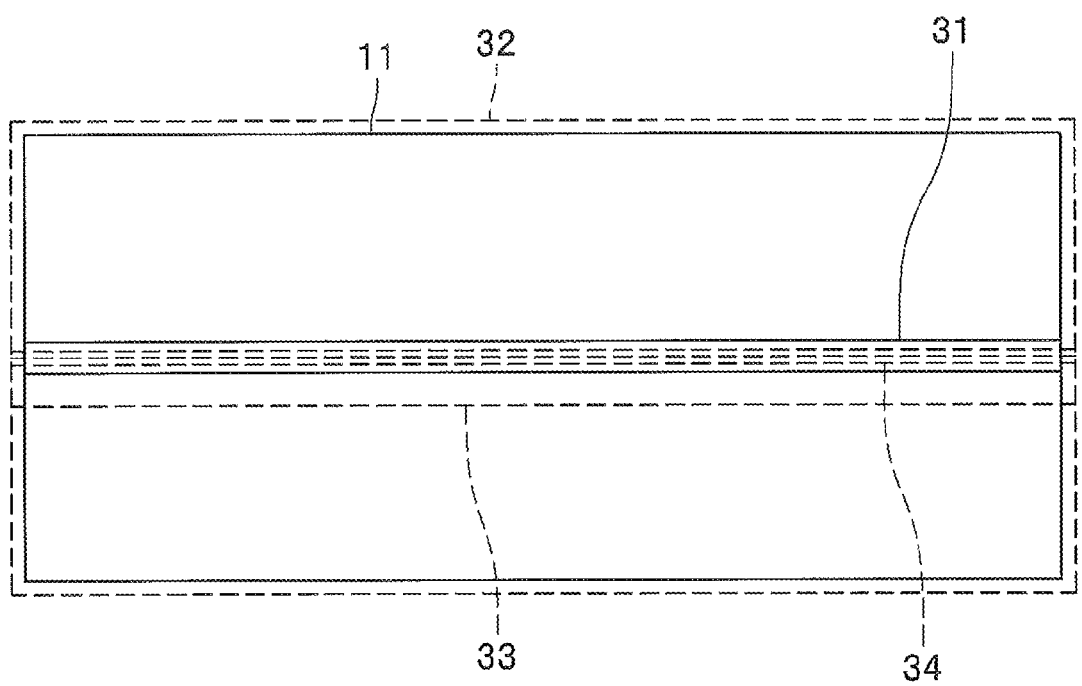
FIG. 6 is an explanatory view for explaining a step of providing the twist-preventing member and the heat-shrinkable film to the airbag body of the airbag device according to the embodiment of the present invention.
Figure 7:
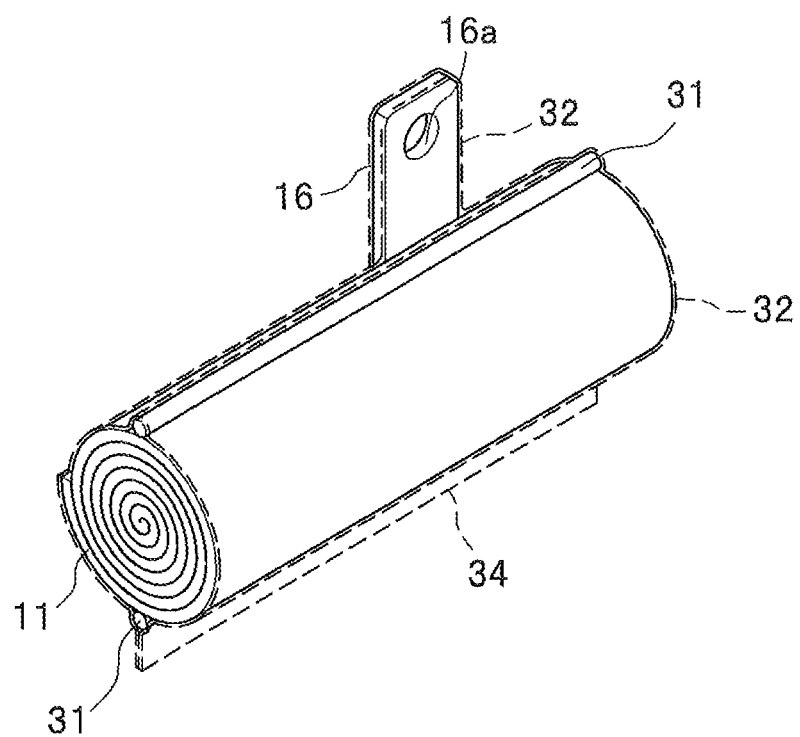
FIG. 7 is an explanatory view for explaining a step of providing the twist-preventing member and the heat-shrinkable film to the airbag body of the airbag device according to the embodiment of the present invention.

Next, steps (a covering method of an airbag body) of providing the twist-preventing members 31 and the heat-shrinkable film 32 described above to the airbag body 11 will be described step by step. FIGS. 4 to 7 are explanatory views for explaining the steps of providing the twist-preventing members 31 and the heat-shrinkable film 32 to the airbag body 11. FIGS. 4, 5 and 7 show perspective views and FIG. 6 shows a bottom view.

(1) First Step

First, as shown in FIG. 4, two twist-preventing members 31 are respectively placed on the top and bottom of the airbag body 11 described above. This is performed so that the length direction of the twist-preventing members 31 can be aligned with the longitudinal direction of the airbag body 11. Note that, since the airbag body 11 is an elongated shape as shown in FIG. 1, the airbag body 11, the twist-preventing members 31, and the heat-shrinkable film 32 are illustrated, for convenience, by cutting out only a portion in the longitudinal direction of the airbag body 11 in FIGS. 4 to 7.

(2) Second Step

Next, after the first step, as shown in FIG. 4, the heat-shrinkable film 32 is wound on the airbag body 11, on which the twist-preventing members 31 are placed, to downward from the tab 16 as an apex, so as to cover the whole.

(3) Third Step

Next, after the second step, the tab 16 and the heat-shrinkable film 32 covering it are fixed together by clamping with a jig or the like (not shown). This is for preventing wrinkles of the heat-shrinkable film 32 at the tab 16 portion. FIG. 5 shows this state without showing the jig or the like.

(4) Fourth Step

Next, after the third step, as shown in FIG. 5, both ends of the heat-shrinkable film 32 located under the airbag body 11 are welded, and an extra length of the heat-shrinkable film 32 is cut, so that a welded portion 34 of the heat-shrinkable film 32 is formed under the airbag body 11. In this case, the twist-preventing member 31 on the lower side is assumed to be positioned between the welded portion 34 and the airbag body 11.

(5) Fifth Step

Next, after the fourth step, as shown in FIG. 6 (also refer to FIG. 3), the breaking portion 33, which is the perforation-like slit, is formed in the heat-shrinkable film 32 located beneath the airbag body 11, the length direction of the breaking portion 33 being aligned with the longitudinal direction of the airbag body 11. The breaking portion 33 is formed so as not to overlap the position of the twist-preventing member 31 on the lower side. Further, the breaking portion 33 is formed only one, but may be two or more.

(6) Sixth Step

Finally, after the fifth step, by blowing hot air to heat the entire heat-shrinkable film 32, the entire heat-shrinkable film 32 is heat-shrunk, so that the heat-shrinkable film 32 is brought into close contact with the airbag body 11, the twist-preventing members 31, and the tab 16, as shown in FIG. 7. As a result, a volume of the airbag body 11 is reduced by a pressure of the heat-shrinkable film 32 which has been heat-shrunk.

Next, operations of the airbag device 1 will be described. First, activation of the airbag device 1 will be described. When a strong impact during a collision of the vehicle 101 is detected by the acceleration sensor (not shown), the ECU (not shown) of the vehicle 101 attached with the airbag device 1 introduces the gas (pressure fluid) into the airbag body 11 by activating the inflator 14. Thus, the airbag body 11 is inflated in a very short time, to be expanded in the vehicle compartment 123 as shown by the two-dot chain line in FIG. 1. At this time, the roof lining and the pillar garnishes (both are not shown) described above are peeled off by the pressure of the inflated airbag body 11. Then, the airbag body 11 is expanded in the vehicle compartment 123 from a space, which is formed by the peeling, between the vehicle body 104 and the roof lining, the pillar garnishes. The tapes 15 are also cut by inflation pressure of the airbag body 11. Further, the heat-shrinkable film 32 is broken at the breaking portion 33 by inflation of the airbag body 11, and the airbag body 11 jumps out from an opening formed by breaking of the heat-shrinkable film 32, and thus the heat-shrinkable film 32 does not prevent expansion of the airbag body 11.

Next, an attaching operation of the airbag device 1 to the vehicle 101 will be described. The airbag body 11 in the folded state is firmly fixed and held by the heat-shrinkable film 32 which is heat-shrunk, in the state where the twist-preventing members 31 are placed thereon. Therefore, the elongated airbag body 11 is supported by the twist-preventing members 31 and the heat-shrinkable film 32, so that it is difficult to be bent or warped. As described above, the airbag body 11 is provided with the tabs 16, for example, at five portions thereof, and the airbag device 1 is attached to the vehicle body 104 by attaching each of the tabs 16 to the vehicle body 104 by the clips 21. Then, when sequentially performing an attaching operation of each of the tabs 16 to the vehicle body 104, a portion of the airbag body 11 on the side of the tabs 16 which are not yet attached to the vehicle body 104 is difficult to be bent or warped, and thus the airbag body 11 is not twisted during the attaching operation. Therefore, it is possible to prevent the airbag body 11 from being attached to the vehicle body 104 while it is in a twisted state.

Further, the tabs 16 are also covered with the heat-shrinkable film 32 which is heat-shrunk, and are firmly fixed and held together with the airbag body 11 by the heat-shrinkable film 32. Therefore, even in a case where the tabs 16 are attached to the flexible airbag body 11 formed of a fabric member, the tabs 16 can be held in an upright state from the airbag body 11, and do not fall down. Therefore, it is easy to perform the attaching operation of the tabs 16 to the vehicle body 104. Further, the airbag body 11 is attached to the vehicle body 104 in a state of being covered with the heat-shrinkable film 32. Therefore, it is possible to prevent the airbag body 11 from being damaged due to irregularities or the like existing on a surface of the vehicle body 104, during the attaching operation of the airbag 11 or after the attaching operation.

Since the breaking portion 33 is formed in the heat-shrinkable film 32 so as not to overlap the twist-preventing member 31, the breaking portion 33 is not inadvertently broken by a pressure of the twist-preventing member 31, for example, during the attaching operation of the airbag body 11 to the vehicle body 104. Since the airbag body 11 is firmly fixed and held by the heat-shrinkable film 32 which is heat-shrunk, it is possible to attach the airbag body 11 to the vehicle body 104 in a sufficiently compressed state. Therefore, it is possible to reduce the size of the airbag device 1.

Figure 8:
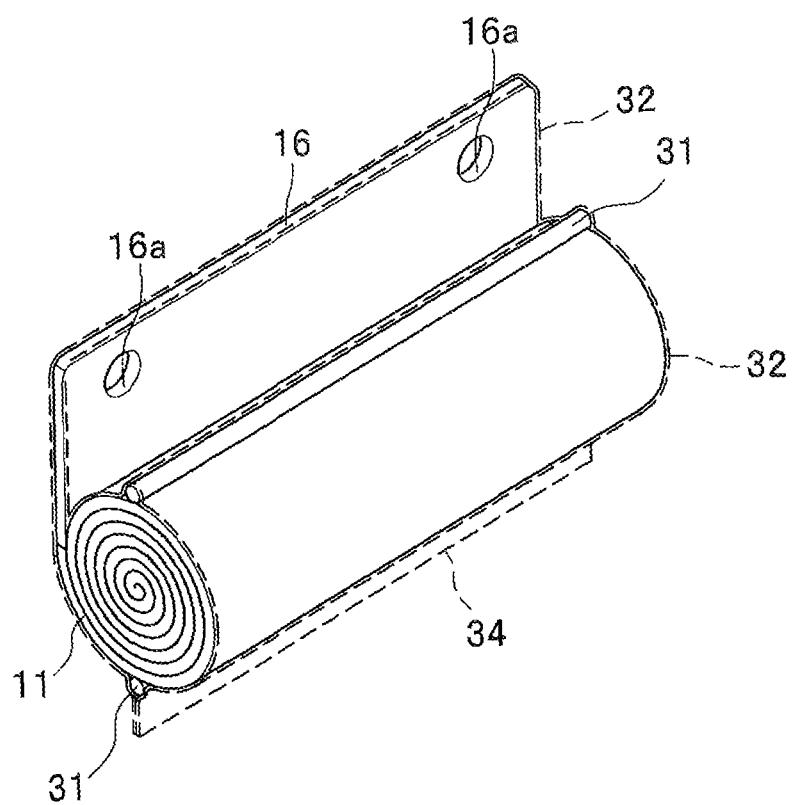
FIG. 8 is an enlarged perspective view taken in a longitudinal direction of a portion of the airbag body in the airbag device which is a modification of the embodiment of the present invention.

Note that, the present invention is not limited to the embodiments described above, and it is needless to say that the present invention includes various modifications. FIG. 8 is an enlarged perspective view taken in a longitudinal direction of a portion of the airbag body 11 in the airbag device 1 which is a modification of the present embodiment, and is a view corresponding to FIG. 7 described above. In the airbag device 1 described above, as shown in FIG. 1, for example, five tabs 16 are provided side by side spaced apart from each other at predetermined intervals in the longitudinal direction of the airbag body 11. In contrast, in the present modification, a tab 16 is formed over the entire longitudinal direction of the airbag body 11 in the folded state. In other words, the tab 16, which is continuous in the longitudinal direction of the airbag body 11, projects from the airbag body 11 over the entire longitudinal direction of the airbag body 11. Then, in the continuous tab 16 having substantially the same length with the airbag body 11 in the folded state, attachment holes 16a for attaching the airbag body 11 to the vehicle body 104 by the clips 21 are formed spaced apart from each other at predetermined intervals. Note that, since the airbag body 11 is an elongated shape, a portion of the airbag body 11 is shown by cutting out, also in FIG. 8 similarly to FIG. 7 etc. Then, over the entire longitudinal direction of the airbag body 11, the entire tab 16 which is continuous in the longitudinal direction of the airbag body 11 from the airbag body 11, is covered with the heat-shrinkable film 32, and the heat-shrinkable film 32 is heat-shrunk. In this manner, the tab 16 which is continuous over the entire longitudinal direction of the airbag body 11 is formed, and the entire continuous tab 16 is covered with the heat-shrinkable film 32. Then, by heat-shrinking the heat-shrinkable film 32, the tab 16 and the heat-shrinkable film 32 covering the tab 16 can also contribute to preventing twisting of the airbag body 11.

Further, for example, the airbag device 1 is described with an example of a side curtain airbag device, but the present invention can be applied to various types of airbag devices. Further, in the example described above, an example of the rod member is described as the twist-preventing member 31, however, members of various shapes can be employed as long as they can prevent twisting of the airbag body 11. The positions, in which the twist-preventing members 31 are placed on the airbag body 11, are not limited to the top and bottom of the airbag body 11, but they may also be placed on the left and right sides of the airbag body 11.

Further, when a transparent film is used as the heat-shrinkable film 32, it is possible to check the folded state of the airbag body 11 from the outside. Further, when a colored film is used as the heat-shrinkable film 32, it is possible to call various attentions, for example, by printing to display an attachment method, operating precautions or the like of the airbag body 11. Further, when relatively thick film is used as the heat-shrinkable film 32, it is suitable to prevent the airbag body 11 from being damaged due to irregularities or the like existing on the surface of the vehicle body. Furthermore, it is also suitable to prevent the airbag body 11 from hydrolysis, degradation by chemicals, and oxidative degradation of a base fabric material constituting the airbag body 11.

REFERENCE SIGNS LIST

1: airbag device
11: airbag body
14: inflator
16: tab (attachment portion)
31: twist-preventing member (rod member)
32: heat-shrinkable film
33: breaking portion

The invention claimed is:

1. An airbag device comprising:
   an inflator;
   an airbag body which is folded, so as to be inflated with a gas generated from the inflator to flow therein upon activation of the inflator;
   a twist-preventing member for preventing twisting of the airbag body in a folded state;
   a heat-shrinkable film for directly covering the twist-preventing member and the airbag body in the folded state; and
   an attachment portion for attaching the airbag body to a vehicle body,
   wherein the heat-shrinkable film further covers the entire attachment portion.

2. The airbag device according to claim 1, wherein the twist-preventing member is a rod member provided so as to be along the airbag body, a length direction of the twist-preventing member being aligned with a longitudinal direction of the airbag body.

3. The airbag device according to claim 1, wherein the attachment portion is continuously formed over the entire longitudinal direction of the airbag body in the folded state.

4. The airbag device according to claim 1, wherein the heat-shrinkable film further includes a breaking portion to be broken when the airbag body is inflated.

5. The airbag device according to claim 4, wherein the breaking portion is formed in the heat-shrinkable film so as not to overlap the twist-preventing member.

6. The airbag device according to claim 1, wherein the twist-preventing member is provided on a top surface of the folded airbag body, and a second twist-preventing member is provided on a bottom surface of the folded airbag body.

7. A covering method for an airbag body, comprising following steps:
   a step of placing a twist-preventing member for preventing twisting of the airbag body on the airbag body which is folded;
   a step of placing an attachment pardon for attaching the airbag body to the vehicle body;
   a step of covering the airbag body, the attaching portion and the twist-preventing member with a heat-shrinkable film after the above steps; and
   a step of heat-shrink by heating the heat-shrinkable film to directly cover the twist-preventing member, the entire attaching portion and the airbag body with the heat-shrinkable film after the above steps.

* * * * *